3,444,097
HYDROCARBON CONVERSION CATALYST
Raymond W. Barclay, Rutherford, N.J., assignor to Mobil
    Oil Corporation, a corporation of New York
No Drawing. Filed June 30, 1965, Ser. No. 468,629
            Int. Cl. B01j *11/40*
U.S. Cl. 252—455                                    11 Claims

ABSTRACT OF THE DISCLOSURE

This invention pertains to a novel method of preparing a hydrocarbon conversion catalyst. The novel preparation step consists of spray drying and concurrently activating the catalyst by spray drying a liquid catalyst mixture into a gaseous activating medium maintained at a temperature above 500° F. The liquid catalyst mixtures consist of a slurry of a crystalline aluminosilicate and a slurry of various organic and inorganic compositions which serve as matrices, diluents, binders, etc. The major portion of the spray drying atmosphere is comprised of at least one activating compound selected from the group consisting of $CO_2$, $N_2O$, $NO$, $NO_2$, $H_2S$, $H_2Se$, $CH_3SH$, $C_6H_5SH$, $HCN$, $CS_2$, $HBl$, $HCr$, and $HI$.

---

This invention relates to catalyst compositions, methods for their manufacture and processes for conversion in the presence thereof. More particularly, the present invention relates to new catalysts of high activity and improved properties comprising crystalline aluminosilicates and to methods for manufacturing such catalysts, including spray-drying the precursor of said catalysts into an activating atmosphere.

Numerous catalysts are presently available for reactions such as hydrogenation, water gas conversion, desulfurization, cyclization, alkylation, isomerization, polymerization, and cracking of petroleum hydrocarbons and the like. Various processes are also suitable for carrying out such reactions in the presence of a catalyst by batch, semibatch and continuous methods. Generally, continuous processes are preferred, since they eliminate costly start-up and shutdowns between runs. Among the more common continuous catalytic methods in use today are the fluidized-bed methods which have been used to conduct a wide variety of catalytic reactions. The present invention is particularly suited to the production of catalysts for use in such fluidized-bed operations.

With reference to the conversion of petroleum hydrocarbons, fluidized-bed processes entail contacting a finely divided catalyst with heated hydrocarbon vapor or gas in a reactor at temperatures at which cracking or other conversion of hydrocarbon molecules takes place. The catalyst is said to be fluidized since it is suspended in a stream of hydrocarbon vapors and the mixture of finely divided catalyst and oil vapors has the appearance and characteristics of a fluid.

In general, several properties of catalysts contribute to the success of fluidized-bed processes. Thus, fine and substantially uniform particle size, uniform porosity, attrition resistance and a satisfactory level of catalytic activity all are essential to the conductor of successful commercial fluidized-bed operations.

While certain fluidized catalysts and techniques have been found satisfactory, as evidenced by wide industrial acceptance and use of fluidized catalytic processes in the petroleum and other industries, research has continued for the purpose of developing new and improved catalytic compositions, as well as methods of manufacturing and using the improved catalysts. As a result of these continued efforts, a superior new class of catalysts has been discovered.

The novel class of catalysts of the present invention are characterized by extraordinary activity, especially for the conversion of hydrocarbons utilizing fluidized-bed techniques. In fact, the relative activity of these catalysts is so astonishing that early experiments were discouraging due to the rapid build-up of a carbonaceous or hydrocarbonaceous deposit on the surface of the catalyst. Only after considerable investigation was it learned that the catalysts actually possessed excellent conversion selectivity. Attention was then directed to methods for improving such catalysts to permit their efficient use in current and future catalytic processes and apparatus.

It is an object of the present invention to provide new catalysts having outstanding activity and selectivity suitable for use in fluidized catalytic processes.

It is a further object of this invention to provide a method for controlling the properties of high activity fluid catalysts.

It is still further an object of this inventtion to provide a process for effective conversion of petroleum hydrocarbon in the presence of the aforesaid fluid catalysts.

A very important object of the invention is to provide a new active petroleum conversion catalyst, suitable for fluid operation, comprising a modified crystalline aluminosilicate.

In general, the present invention relates to a method for producing modified crystalline aluminosilicates, to the products so modified and their use as fluid catalysts for a variety of chemical reactions. The method broadly involves the spray drying of a liquid mixture or slurry containing a crystalline aluminosilicate into a gaseous medium maintained at a temperature sufficiently elevated to flash off the liquid admixed with said crystalline aluminosilicate and comprising a component which upon contact under activation conditions with the sprayed crystalline aluminosilicate particles serves to activate and chemically modify such particles to enhance the catalytic characteristics thereof.

As previous described, crystalline aluminosilicates have been found to have extraordinary catalytic properties, especially for the conversion of hydrocarbon charge material. An outstanding feature of the present invention lies in the provision of a method for modifying the properties of such catalysts, including their activity and selectivity.

The particles which are spray-dried according to this invention may consist essentially of a crystalline aluminosilicate or may comprise a mixture or composite of the crystalline aluminosilicate with another material. The second material which is mixed or composited with the crystalline aluminosilicate may include various organic and inorganic compounds and compositions which serve as matrices, diluents, binders or the like for the aluminosilicate.

Since spray-drying readily lends itself to the production of finely divided spheroidal particles, the present invention is especially suited to the production of catalysts for use in fluidized-bed processes. However, the spray-dried product may also be utilized in the formation of catalysts of substantial particle size by pelleting or other techniques. For example, larger-size particle catalysts for use in moving bed or fixed bed processes may be prepared from the small spray-dried particles of the present invention by mixing the small particles with a binder to form larger agglomerates. The spray-dried particles may also be dispersed in gel-forming solutions and contained in and distributed throughout relatively large size inorganic oxide hydrogel or gel particles, such as, for example, beads of inorganic oxide gel utilizing the techniques described in U.S. 2,384,946.

According to a preferred embodiment of the present invention, a crystalline aluminosilicate and a relatively inactive diluent matrix are spray-dried to form finely divided, spheroidal particles. The particles are spray-dried in an atmosphere consisting of or containing an effective amount of a component in the gaseous state, which serves catalytically to activate under conditions of activation the aluminosilicate, such as $CO_2$, $N_2O$, NO, $NO_2$, $H_2S$, $H_2Se$, $CH_3SH$, $C_6H_5SH$, HCN, $CS_2$, $SO_2$, HBr, HCl and HI.

The aluminosilicate catalysts of the present invention are especially characterized by a relative conversion activity of an entirely different order than the activity of conventional cracking catalysts. Cracking activity is commonly measured by the CAT A test which is well known in the industry. When first evaluated by this test, the present crystalline aluminosilicates did not appear to offer much promise due to the formation of excessive coke. However, further investigation indicated that rather than being useless, the crystalline aluminosilicates actually possessed such high activity that they could not be accurately tested by the CAT A method which is designed for conventional catalysts. Consequently, a test capable of defining the catalyst activity more precisely had to be developed.

In order to measure catalytic activity over such a wide range, a novel test has been devised. The span of activities among the catalysts investigated by the following test is so large that comparison tests of cracking at any standard temperature would result in either conversion too low for analytical determination at one end of the scale, or so close to complete conversion at the other end that no useful measure is attainable. Thus, it was found necessary to crack over comparatively inactive catalysts, e.g., a standard silica-alumina gel cracking catalyst, at relatively high temperatures, and to crack over superactive crystalline aluminosilicate catalysts at relatively low temperatures, in order to effect reasonable conversion. It was found that the relationship between the reaction rate constant for the catalytic cracking of n-hexane, was capable of presentation in a straight line relationship with conversion temperature, assuming a first order reaction. Accordingly, similarities have been found in the slopes of Arrhenius plots (apparent activation energies) of activity among various catalytic compositions, including silica-alumina and various superactive crystalline aluminosilicates. Consequently, it appears justifiable to compare relative activity magnitudes by extrapolation to a standard temperature chosen to be 1000° F. The apparatus employed includes a micro reactor containing 1.5 cc. of the test catalyst in particles of a size in the range of 12–28 mesh or less. By the use of heating elements and temperature measuring devices, it was possible to maintain the reactor bed at substantially constant conversion temperature. A stream of n-hexane in helium at 25° C. was passed over the catalyst at conversion temperature with a 9-second superficial contact time (superficial catalyst volume/gaseous volume flow rate). A sample was collected 5 minutes after reaction commencement and analyzed to determine the fraction of n-hexane cracked to lower boiling hydrocarbons and other products. Conversion temperatures were chosen for accuracy of measurement so that conversion generally was in the range of 5–40 percent.

Conversion may be measured at a specific conversion temperature according to the following proportional relationship:

$$k \sim (1/\tau) \log \frac{1}{1-\epsilon}$$

where $k$ is the reaction rate constant, $\epsilon$ is conversion and $\tau$ is residence time.

A relative rate constant for a particular catalyst composition is defined by:

$$k/k°_{SiAl} = \frac{\tau_{SiAl}}{\tau} \frac{\log \frac{1}{1-\epsilon}}{\log \frac{1}{1-\epsilon°_{SiAl}}}$$

wherein $k/k°_{SiAl}$ is the rate constant relative to a standard silica-alumina cracking catalyst for conversion at 1000° F., $k°_{SiAl}$ being the rate constant for the standard silica-alumina catalyst, $\epsilon°_{SiAl}$ is the conversion for the standard catalyst at 1000° F., and $\tau_{SiAl}$ is the residence time for conversion over the standard catalyst.

It was observed that the relationship of relative activity, $k/k°_{SiAl}$, on a logarithmic ordinate with the inverse of the absolute temperature of conversion on a proportional abscissa was substantially a straight line function. Thus, the activity for a particular component was determined by finding the relative activity for a plurality of temperatures and extrapolating to 1000° F. the above straight-line relationship between relative activity and inverse temperature.

The values for relative activity extrapolated for test catalyst compositions to 1000° F. are hereinafter denominated by the term alpha ($\alpha$). Thus, alpha ($\alpha$) represents the activity of the test catalyst relative to a standard sample of silica-alumina. Accordingly, the rate constant alpha ($\alpha$) is relative to the rate constant of a highly active conventional amorphous silica-alumina cracking catalyst obtained by cogelation [see Alexander, J., Proceedings Amer. Pet. Inst., 27 (III), 51 (November 1947)], containing 10 percent by weight alumina and having a surface area of 420 square meters per gram. The standard catalyst has a petroleum gas oil cracking activity substantially in excess of that of contemporary commercial cracking catalysts; its activity, according to an industrially accepted test method is about 46 AI [see Chem. & Met. Eng. 53, 94–98, 138–141 (April 1946)]. The standard catalyst converts by cracking 12.5 percent of n-hexane in a stream of helium, the catalyst being at 1000° F., after 5 minutes of the 9-second superficial contact time.

According to the above test crystalline aluminosilicate components were found to have alphas in the range of between about 0.5 to substantially greater than 10,000. Conventional cracking catalysts and other amorphous catalytic materials exhibited alphas generally in the range of about 0.1 to 2.0.

Once the extraordinarily high relative conversion activity of the crystalline aluminosilicates was established, effort was turned towards developing methods, compositions and apparatus which would permit their use in conventional cracking and other catalytic techniques.

Among the general methods devised to enhance the utility of the aluminosilicates are those of compositing with inert or relatively inactive diluent or matrix materials, steam treating, ion-exchanging alkali metal ions initially contained in the crystalline aluminosilicate with other metal ions and/or hydrogen ions and various combinations of the foregoing methods. In this way it has been found possible to harness the extremely high activity of the aluminosilicates and adapt them for use in current catalytic methods and apparatus.

Generally, the crystalline aluminosilicate materials with which this invention is concerned have the following general formula:

$$\frac{M_2O}{n} \cdot Al_2O_3 \cdot YSiO_2 \cdot ZH_2O$$

in the salt form, wherein $n$ is the valence of the metal cation M, Y is the number of moles of silica, and $ZH_2O$ is the water of hydration.

Crystalline aluminosilicates of the above structure, sometimes referred to as crystalline zeolites or molecular sieves, may be activated by removal of the water of hydration and when so activated possess sites capable of promoting catalytic conversions. Upon dehydration, the aluminosilicates are highly porous, characterized by a uniform structure of numerous surface cavities and internal pores. These pores are of substantially uniform diameter, generally in the range of from 3 to 15 Angstroms, with the exact size depending upon the composition and structure of the specific aluminosilicate.

In order to modify the properties of such materials, the original cations of the aluminosilicates, usually sodium, may also be changed by processes of ion-exchange. Ion-exchange of the original ions have been found to have an especially beneficial effect on the catalytic cracking properties of the crystalline aluminosilicates.

Suitable crystalline aluminosilicates for use in the production of the catalysts of the present invention include both natural and synthetic crystalline aluminosilicates or zeolites.

A wide variety of natural crystalline zeolites exists and those satisfactory for the present invention include, for example, analcite, paulingite, offretite, ptilolite, clinotilolite, ferrierite, chabazite, gmelnite, levynite, faujasite and mordenite.

Among the most suitable synthetic crystalline aluminosilicates are the synthetic faujasites, including both X and Y types which have crystal structure corresponding to that of natural faujasite. The preparation of the X aluminosilicates is described in U.S. Patent 2,882,244. The preparation of the Y type is described in U.S. Patent 3,130,007.

Other suitable synthetic crystalline zeolites useful in the present invention include, for example: Zeolites A, B, D, E, F, L, Q, R, S, T, Z, ZK-4 and ZK-5 each described in U.S. Patent 3,140,251.

Alpha values for certain crystalline aluminosilicates have been determined according to the test procedure described hereinabove. It should be realized that any single composition may exhibit widely varying activities, depending primarily upon method of preparation, exchange cations or the like. Thus, the values presented below are typical single measurements of the activity, representative of each aluminosilicate component.

| Crystalline aluminosilicate | Alpha ($\alpha$) |
|---|---|
| Synthetic: | |
| Sodium X | 1 |
| Rare earth X[1] | >10,000 |
| Magnesium X[1] | 1.2 |
| Platinum X[2] | 5 |
| Hydrogen X[1] | 50 |
| Zinc X[1] | 12 |
| CoMo rare earth X[3] | 20 |
| Rare earth hydrogen X[1] | >10,000 |
| Titanium hydrogen Y[1] | 5,000 |
| Titanium Y[1] | 0.7 |
| Iron hydrogen Y[1] | >10,000 |
| Hydrogen Y[1] | 5,000 |
| Rare earth hydrogen Y[1] | 7,000 |
| Calcium A[1] | 0.4 |
| Sodium A | 0.1 |
| Rare earth A[1] | 10 |
| Calcium T[1] | 0.4 |
| Calcium S[1] | 0.4 |
| Hydrogen S[1] | >10,000 |
| Hydrogen T[1] | >10,000 |
| Hydrogen L[1] | 300 |
| Natural materials: | |
| Natural crystalline aluminosilicates generally | 0.1–1.1 |
| Hydrogen mordenite[4] | >10,000 |
| Rare earth chabazite[5] | 10 |
| Hydrogen chabazite[4] | >10,000 |
| Hydrogen gmelinite[4] | >10,000 |
| Hydrogen offretite[4] | >10,000 |

[1] Base exchanged sodium zeolite X, Y, etc.
[2] Impregnated sodium zeolite X.
[3] Rare earth base-exchanged, sodium zeolite X impregnated with cobalt oxide, and molybdena.
[4] Base exchanged with hydrogen or hydrogen precursor ions.
[5] Base exchanged with rare earth ions.

From the above lists, it can be seen that natural and synthetic zeolites or crystalline aluminosilicates possess varying activities for n-hexane cracking, some species being more than 10,000 times as active as a high activity silica-alumina. For hydrocarbon conversion processes, preferably the crystalline aluminosilicate component (in the form existing in the final composite) is characterized by an alpha ($\alpha$) greater than 2.

Since the natural crystalline aluminosilicates are not all available in abundance, the synthetic zeolites are preferred for starting materials for the preparation of catalysts in accordance with the present invention.

For example, highly useful crystalline aluminosilicate catalysts may be prepared by subjecting sodium X aluminosilicate to ion exchange with a solution of rare earth chlorides until the sodium content is reduced to about 1.0–1.5 percent by weight.

The aluminosilicate materials may also be converted in part to the H or acid form in which hydrogen ions occupy the cation sites. For example, such a conversion may be had by ion-exchange with an ammonium ion followed by heating to drive off $NH_3$ or by controlled acid leaching with a hydrochloric acid solution or like reagent. It is essential that the aluminosilicate undergoing activation according to the present invention be a metal-containing aluminosilicate. Aluminosilicates in which all of the initial alkali metal or other metal ions are replaced by hydrogen or ammonium ions do not respond to activation by contact with the present activators.

Useful catalysts are also produced by a combination of ion-exchange techniques. For example, the crystalline aluminosilicates may be converted to the H or acid form by acid leaching and then may be ion-exchanged with a solution of rare earth salts to produce catalysts such as rare earth-hydrogen exchanged mordenite, rare earth-hydrogen exchanged synthetic faujasite of X or Y type and other useful ion-exchanged catalysts. It will also be apparent that more than one type of metal cation may be used to ion-exchange the crystalline aluminosilicates and that the sequence of ion-exchange treatments may be varied. For example, acid leaching to substitute hydrogen ions may precede or follow ion-exchange treatment to substitute metal cations.

An essential property of a fluid catalyst is the capability of suspension by a fluidizing agent. This property is dependent to a great extent on the cross sectional area of the particle, and fluidity may vary with reactor conditions and fluidizing agent. Generally speaking, however, particles having a size in the range from 10 to 300 microns are satisfactory for suspension in fluidized beds.

Uniformity of particle size and density is also important, since particles, if they are too large or too small in cross sectional area, have a tendency to separate from more uniform particles and collect in a dense phase or to be carried off with the product stream. This segregation of catalyst particles may in turn preclude uniform activity of the catalyst bed.

Resistance to attrition or disintegration is likewise a desirable characteristic, since particles that break down during the fluidizing operation must be withdrawn and replaced. Attrition also destroys particle size uniformity.

The catalysts of the present invention are generally prepared by spraying a crystalline aluminosilicate of the type described into a drying atmosphere containing an effective amount of a gaseous activating agent which reacts with the aluminosilicate under conditions of activation to modify its properties.

While the invention includes procedures in which particles of crystalline aluminosilicate are spray dried alone into an activating gaseous atmosphere, other preferred embodiments comprise spray drying composite particles of crystalline aluminosilicates dispersed in relatively less active matrix materials. Catalysts may also be prepared according to this invention by spray drying slurries of mixed crystalline aluminosilicate and matrix particles.

According to a preferred embodiment of the present invention improved crystalline aluminosilicates are prepared in the following manner:

(1) a crystalline aluminosilicate may be ion-exchanged to remove at least 75 percent, preferably at least 90 percent, of the original sodium cations. The exchanged crystalline aluminosilicate is ground to a weight mean particle diameter of from 1 to 10 microns and then slurried in water.

(2) The ion-exchanged crystalline aluminosilicate particles as prepared in Step 1 or aluminosilicate particles in the sodium form are then dispersed in a silica-alumina gel matrix material. The dispersion of the active aluminosilicate component in the matrix and the formation of the matrix itself may be accomplished in a number of ways. It has generally been found satisfactory to mix the slurry of aluminosilicate particles with one or more gel forming solution and then to coagulate the gel with the active particles dispersed in it. Better results may be achieved merely by combining slurries of the crystalline aluminosilicate and formed matrix.

(3) Particles of the aluminosilicate and matrix are washed and beaten in water or other liquid to form a paste or slurry in which particles of the composite are finely divided and thoroughly dispersed.

(4) The slurry is then spray dried in an atmospheric reactive with the aluminosilicate to form microspheres of the catalyst suitable for use in fluid catalytic operations or, upon further processing, for other use.

In general, the formation of a hydrogel matrix comprises reacting a silicate-containing solution by the addition of an acid. In a preferred embodiment of the present invention the catalyst matrix is silica-alumina and the production of the catalysts entails the formation of a silica-alumina hydrogel. Such gels generally contain from about 5 to 30 percent by weight of $Al_2O_3$. The alumina may be introduced into the silica hydrogel from one of its soluble salts, such as $Al_2(SO_4)_3$.

It has been also found highly desirable to add fines to the matrix hydrogel. Recycle fines recovered from the spray drying unit or from the catalytic reactor itself are suitable for this purpose. These fines are preferably ground to a weight mean particle diameter of less than 10 microns, preferably 0.3 to 3 microns, and are slurried in water with the fresh aluminosilicate prior to combination with the matrix hydrogel. The addition of the recycle fines in this manner has been found to improve the hardness of the fluid catalyst particles formed by spray-drying.

Optimum fines size for addition to the gel will depend on the final size of the catalyst particles to be produced. Thus, in making fluid catalysts, smaller fines will normally be used than in making larger catalysts for fixed or moving bed catalytic systems.

The general procedure of the invention involves making a pumpable paste or slurry of the crystalline aluminosilicate-containing particles in an aqueous or other liqiud medium. Water, for obviously practical reasons, is the preferred slurry medium. However, in certain cases, for example when HBr or HCl is employed as the activating drying medium, other carriers such as alcohol, acetone, or the like may better be used. Preferably the liquid comprises between about 50–60 percent by weight of the spray slurry, although slurries containing from about 40–95 percent water or other liquid are generally operable. Too high a liquid content in the sprayed slurry requires an inordinate amount of heat to effect evaporation; while too low a liquid content results in difficult slurry transfer and sticking of the product to the dryer walls.

The temperature of the drying gas is maintained generally at a level near the evaporation or boiling point of the carrier liquid. Thus, the temperature depends in part upon the pressure of the system and the identity of the carrier liquid. Generally the inlet temperature of the drying gas is high, up to about 1200° F., to provide heat of evaporation to the wet spray dried particles. The average temperature in the drier is lower, preferably when water is the carrier liquid at about 250–400° F. However, the drier may be operated over a wide range of temperatures, above the evaporation or boiling point of the carrier liquid and below the level at which catalyst distintegration proceeds (about 1400° F.), generally in the range between about 100 and 1000° F.

The spray drying of the catalyst forming slurries or solutions may be accomplished by passing the sprayed droplets countercurrently, concurrently or semicountercurrently to the stream of drying gas. According to the semicountercurrent procedure, the droplets are sprayed up into a chamber containing drying gas which partially dries the droplets, and then cascade downwardly countercurrent to a rising stream of drying gas.

The atmosphere in the spray drier essentially contains a substantial proportion of a gaseous activating medium or combination of gases reactive at activating conditions with the aluminosilicate. The gases may be mixed with one another, with steam or with various inert carrier gases. It is preferred that such activating gases or vapors comprise a major portion of the drying atmosphere.

By control of the identity and concentration of activating gas or vapor, it is possible to alter the catalytic characteristics of the spray-dried aluminosilicate product. Numerous materials react with crystalline aluminosilicates to alter the catalytic characteristics thereof. Gaseous or vaporous materials suitable as a component of the drying fluid include include carbon dioxide; oxides of nitrogen such as nitrogen monoxide, nitrogen oxide, and nitrogen dioxide; mercaptans such as thiophenol and methyl mercaptan; hydrogen sulfide and hydrogen selenide; carbon bisulfide; sulfur dioxide; and hydrogen halides such as hydrogen bromide, hydrogen chloride and hydrogen iodide.

The above recited compounds have been found to be effective activators of crystalline alminosilicate catalyst composites. U.S. Patent 3,033,778, issued on May 8, 1962, to V. J. Frilette, discloses and provides examples of crystalline aluminosilicate activation with carbon dioxide. U.S. Patent 3,178,365, issued on Apr. 13, 1965, to J. N. Miale and P. B. Weisz, discloses and provides examples of crystalline aluminosilicate activation with oxides of nitrogen, specific examples being directed to nitrogen monoxide, and nitrogen oxide activation. U.S. Patent 3,173,855, issued on Mar. 16, 1965, to J. N. Miale and P. B. Weisz, discloses and provides examples of crystalline aluminosilicate activation with hydrogen sulfide, hydrogen selenide, methyl mercaptans and hydrogen cyanide. U.S. Patent 3,175,967, issued on Mar. 30, 1965 to J. N. Miale and P. B. Weisz, discloses and provides examples of crystalline aluminosilicate activation with thiophenol, carbon bisulfide and sulfur dioxide.

Activating conditions, under which a crystalline aluminosilicate in contact with one of the above activators undergoes activation, essentially include an elevated temperature above 500° F., generally above 800° F., and preferably between about 900 and 1250° F. Thus, if the spray drying is effected at a temperature below 500° F., the catalyst must be heated to a temperature above 500° F. before chemical conversion in the presence thereof is completed. The product from the spray drier may be heated to a temperature above 500° F., or the catalyst activation may take place in situ during conversion at temperatures above 500° F., or preferably in the temperature range of about 900 to 1250° F. Alternatively, the spray drier may be maintained at a temperature above 500° F. and activation effected concurrently with drying. Or two steps of activation, one in the spray drier and the second outside the drier or even in the reactor, may be utilized.

The following examples will serve to illustrate specific embodiments of the present invention without limiting the scope thereof.

Example 1

An aqueous slurry of 4 percent of freshly formed silica-alumina hydrogel having a pH of 5 and a temperature of 110° F., is prepared in accordance with the procedure set forth in U.S. Patent 2,941,961. Concentrations of an aluminum salt and of sodium silicate are employed to provide 2 percent of alumina and 98 percent silica to yield a gel having a pore volume when dried of 0.90 cc./g. When submitted to the above-described test to determine catalytic cracking activity the silica alumina gel exhibits an alpha ($\alpha$) of 0.6.

To the freshly prepared silica-alumina hydrogel there is added an aqueous slurry of finely divided sodium zeolite X (NaX). As measured by the above-defined test for determination of catalytic activity, the NaX exhibits an alpha ($\alpha$) of 0.1. The zeolite slurry is added to the freshly formed silica-alumina hydrogel in such a quantity as to provide 15 percent by weight of zeolite based on the dried weight of final composite. The resulting slurry, at a temperature of 110° F. and a pH of 5, is thoroughly mixed and filtered to produce a filter cake. The filter cake is then spray dried into an atmosphere comprising 90 percent by volume carbon dioxide (inlet gas temperature of about 1000° F.) to produce microspheres of from about 1 to 140 microns in diameter, with an average particle size of about 50 microns. The spray-dried particles are then heated to 900° F. for about 1 hour in order to effect activation of the catalyst.

The activated particles are subsequently treated with a 4 percent aqueous solution of ammonium sulfate at 90° F. for 2 minutes and, subsequently, washed with water at 90° F. for 2 minutes. The base-exchange, water-wash cycle is again repeated. Finally, the product is washed with ammonia water at a pH of 7.2 and a temperature of 90° F. for 2 minutes to remove sulfate ions and flash dried in air at an inlet temperature of about 1000° F. and an outlet temperature of about 300° F. The final microsphere catalyst composition, comprising 15 percent by weight zeolite X and 85 percent by weight silica-alumina matrix, according to the above-defined catalytic activity test, exhibits an alpha ($\alpha$) of about 4.

Example 2

The procedure of Example 1 is followed to produce catalyst microspheres spray dried into a carbon dioxide atmosphere. The composition is varied in that the silica-alumina matrix material comprises 13 percent by weight alumina and exhibited an alpha ($\alpha$) of 0.6, and the final catalyst composition comprises 70 percent by weight of zeolite X and 30 percent by weight of the silica-alumina matrix. The activity of the final composite, determined according to the above-defined test, indicates that the composite exhibits an alpha ($\alpha$) of 5.

Example 3

The procedure of Example 1 is again followed except that the composition is spray dried into an atmosphere comprising 75 percent by volume of hydrogen sulfide. The final catalyst composition exhibits an alpha ($\alpha$) of 2.

Example 4

The procedure of Example 1 is followed substantially to incorporate a sodium Y (NaY) zeolite in a silica-alumina matrix comprising 2 percent by weight alumina. The zeolite matrix composition is spray dried into an atmosphere comprising 80 percent by volume methyl mercaptan. The NaY employed exhibits an alpha ($\alpha$) of 0.7. The final catalyst composition contains 20 percent by weight of zeolite Y and 80 percent silica-alumina matrix and exhibits an alpha ($\alpha$) of 5.

Example 5

The procedure of Example 4 is repeated to incorporate 30 percent by weight sodium Y in a silica-alumina matrix, the matrix component comprising 13 percent by weight alumina. Zeolite and matrix is spray dried into an atmosphere comprising 90 percent by volume carbon dioxide at a temperature of about 1000° F. No subsequent hot activating step is required, as activation proceeds in the high temperature reactor. The final catalyst composition, comprising 30 percent by weight zeolite Y and 70 percent silica-alumina matrix, exhibits a catalyst activity, according to the above-defined test, of an alpha ($\alpha$) of 10.

Example 6

This example illustrates the use of catalyst containing finely divided sodium NaX dispersed in a silica-zirconia gel matrix and activated by spray drying in a carbon dioxide atmosphere according to the method of Example 1.

The silica-zirconia matrix is prepared by diluting N-Brand sodium silicate to 5 percent by weight silica, adding sufficient concentrated sulfuric acid to lower the pH of about 9.5, and heating the gelatinous silica for 2 hours at 140° F. An aqueous, 10 percent by weight, zirconium sulfate solution is added in quantities sufficient to produce a matrix containing 2 percent by weight zirconia. Concentrated sulfuric acid is added to reduce the pH to about 3.5, and the pH is then raised to about 4.5 by the addition of 5 percent by weight sodium carbonate solution. The matrix slurry is then cooled to about 90° F. The sodium X slurry and the silica-zirconia matrix slurry are combined and spray dried in a manner similar to that of Example 1 into an 80 percent carbon dioxide atmosphere to give a final product comprising by weight 15 percent zeolite X and 85 percent silica-zirconia matrix. The sodium X exhibits an alpha ($\alpha$) of 0.1 and the silica-zirconia matrix exhibits an alpha ($\alpha$) of 0.2, both prior to their spray drying into carbon dioxide activity atmosphere. The final catalyst composition, after activation at 900° F. for 1 hour subsequent to spray drying, according to the above-defined catalyst activity test, exhibits an alpha ($\alpha$) of 2.

Example 7

The procedure of Example 1 is again repeated except that sodium zeolite A (NaA) was incorporated in the silica alumina matrix, the filtered zeolite-matrix combination in an alcohol slurry is activated by spray drying under anhydrous conditions into an activating atmosphere containing 70 percent by volume hydrogen bromide at 800° F. The final catalyst composition, contains 15 percent by weight zeolite A and 85 percent silica-alumina matrix. The sodium A component used in the final catalyst exhibits an alpha ($\alpha$) of less than 0.1. The final catalyst composition exhibits an alpha ($\alpha$) of 1.0.

It will be evident from the foregoing examples and disclosure that a catalyst composite comprising crystalline aluminosilicate particles and an inorganic oxide matrix may be substantially activated, as measured by the above defined alpha ($\alpha$) test, by spray drying of a mixture of crystalline aluminosilicate particles and matrix into an atmosphere comprising an effective amount of a gas or vapor reactive with and serving to activate under conditions of activation the crystalline aluminosilicate such as $CO_2$, $N_2O$, $NO$, $NO_2$, $H_2S$, $H_2Se$, $CH_3SH$, $C_6H_5SH$, $HCN$, $CS_2$, $SO_2$, $HBr$, $HCl$, $HI$ and the like. It will be understood that the above description is merely illustrative of preferred embodiments of the invention. Additional modifications and improvements utilizing the discoveries of the present invention can be readily determined by those skilled in the art from the present disclosure, and such modifications and improvements may fairly be presumed to be within the scope and purview of the invention as defined by the claims that follow.

I claim:

1. A method of preparing a catalyst composition which comprises spray drying a liquid mixture containing crystalline aluminosilicate particles into a gaseous medium maintained at a temperature above 500° F. comprising a component which upon contact with the sprayed crystalline aluminosilicate particles serves concurrently to dry and activate such particles, thereby enhancing the catalytic characteristics thereof.

2. The method of claim 1 wherein said catalyst composition is activated to the extent that it exhibits in its final form an alpha ($\alpha$) of at least 2.

3. A method of preparing a catalyst composition which comprises admixing a crystalline aluminosilicate and an inorganic oxide matrix in the form of a liquid slurry and spray drying said slurry into a gaseous medium maintained at a temperature above 500° F. comprising a component which upon contact with the sprayed crystalline aluminosilicate particles serves concurrently to dry and activate such particles, thereby enhancing the catalytic characteristics thereof.

4. The method of claim 3 wherein said crystalline aluminosilicate and said inorganic oxide matrix, both prior to activation by spray drying, are characterized by alphas ($\alpha$) of less than about 1.0 and said catalyst composition after activation is characterized by an alpha ($\alpha$) greater than about 2.

5. The method of claim 1 wherein said gaseous activating compound is selected from the group consisting of $CO_2$, $N_2O$, NO, $NO_2$, $H_2S$, $H_2Se$, $CH_3SH$, $C_6H_5SH$, HCN, $CS_2$, $SO_2$, HBr, HCl and HI.

6. The method of claim 3 wherein said gaseous activating compound is selected from the group consisting of $CO_2$, $N_2O$, NO, $NO_2$, $H_2S$, $H_2Se$, $CH_3SH$, $C_6H_5SH$, HCN, $CS_2$, $SO_2$, HBr, HCl and HI.

7. A method of preparing a fluid hydrocarbon conversion catalyst which comprises combining a slurry of an inorganic oxide in a liquid with a slurry of a crystalline aluminosilicate in a liquid, admixing the two slurries, filtering said mixture to form a filter cake of said inorganic oxide and said crystalline aluminosilicate, spray drying said filter cake into a gaseous medium maintained at a temperature above 500° F. comprising a major proportion of at least one activating compound selected from the group consisting of $CO_2$, $N_2O$, NO, $NO_2$, $H_2S$, $H_2Se$, $CH_3SH$, $C_6H_5SH$, HCN, $CS_2$, $SO_2$, HBr, HCl and HI.

8. The method of claim 7 wherein said crystalline aluminosilicate is Zeolite X.

9. The method of claim 7 wherein said crystalline aluminosilicate is Zeolite Y.

10. The method of claim 5 wherein said inorganic oxide is silica-alumina.

11. The method of claim 5 wherein said inorganic oxide is silica-zirconia.

References Cited

UNITED STATES PATENTS

| | | | |
|---|---|---|---|
| 3,140,253 | 7/1964 | Plank et al. | 208—120 |
| 3,173,855 | 3/1965 | Miale et al. | 208—120 |
| 3,175,967 | 3/1965 | Miale et al. | 208—120 |
| 3,260,680 | 7/1966 | Sanford et al. | 208—120 |

DELBERT E. GANTZ, *Primary Examiner.*

T. H. YOUNG, *Assistant Examiner.*

U.S. Cl. X.R.

208—120